(12) United States Patent
Jarvie (10) Patent No.: US 8,850,872 B2
(45) Date of Patent: Oct. 7, 2014

(54) LINE LEAK DETECTOR AND METHOD OF USING SAME

(75) Inventor: Ian F. Jarvie, Woodridge, IL (US)

(73) Assignee: OPW Fuel Management Systems, Inc., Hodgkins, IL (US)

( * ) Notice: Subject to any disclaimer, the term of this patent is extended or adjusted under 35 U.S.C. 154(b) by 285 days.

(21) Appl. No.: 13/293,864

(22) Filed: Nov. 10, 2011

(65) Prior Publication Data
US 2012/0160013 A1    Jun. 28, 2012

Related U.S. Application Data (63) Continuation-in-part of application No. 12/437,759, filed on May 8, 2009, now Pat. No. 8,316,695.

(51) Int. Cl.
| | |
|---|---|
| *G01M 3/26* | (2006.01) |
| *G01M 3/18* | (2006.01) |
| *G01M 3/28* | (2006.01) |
| *G01M 3/14* | (2006.01) |

(52) U.S. Cl.
CPC ............ *G01M 3/2892* (2013.01); *G01M 3/144* (2013.01)
USPC ............... 73/40.5 R; 73/47; 73/49.7; 137/409

(58) Field of Classification Search
USPC ........ 137/397, 398, 409, 410; 251/11, 49, 65; 73/40–49.8
See application file for complete search history.

(56) References Cited

U.S. PATENT DOCUMENTS

| | | | |
|---|---|---|---|
| 2,043,227 A | 6/1936 | Bennett | |
| 2,771,769 A | 11/1956 | Nielsen | |
| 2,853,874 A | 9/1958 | Mennesson | |
| 3,085,423 A | 4/1963 | Champion | |
| 3,212,751 A | 10/1965 | Hassa | |
| 3,439,837 A * | 4/1969 | Hearn et al. | ..................... 222/52 |
| 3,454,195 A | 7/1969 | Deters | |
| 3,467,135 A | 9/1969 | Muskalla | |
| 3,495,620 A | 2/1970 | Raimondi et al. | |
| 3,566,912 A | 3/1971 | Dunkelis | |

(Continued)

FOREIGN PATENT DOCUMENTS

| | | |
|---|---|---|
| DE | 27 06 541 | 8/1978 |
| DE | 35 39 167 | 5/1986 |

(Continued)

OTHER PUBLICATIONS

Ann-Sofie Hallbäck; European Search Report issued in related European Patent Application No. EP 10 25 0842; Aug. 12, 2010; 8 pages; European Patent Office.

(Continued)

*Primary Examiner* — David A Rogers
(74) *Attorney, Agent, or Firm* — Wood, Herron & Evans, LLP (57) ABSTRACT

An apparatus for detecting a leak in a conduit line includes a housing in fluid communication with the line, a valve including a valve seat and a valve element movable relative to the seat between opened and closed positions, a bypass line around the valve, a flow detector coupled to the bypass line for detecting fluid flow therethrough, and a mechanism configured to urge the valve element toward the closed position and to maintain the valve element in the closed position until a threshold pressure drop is reached. The mechanism may operate on the principle of magnetism.

20 Claims, 6 Drawing Sheets

(56) References Cited

U.S. PATENT DOCUMENTS

| | | |
|---|---|---|
| 3,570,806 A | 3/1971 | Sturman et al. |
| 3,570,807 A | 3/1971 | Sturman et al. |
| 3,722,850 A | 3/1973 | Kemper |
| 3,762,442 A | 10/1973 | Paul |
| 3,788,127 A | 1/1974 | Marsh |
| 3,793,876 A | 2/1974 | Oswald |
| 3,803,912 A | 4/1974 | Ohno |
| 3,817,087 A | 6/1974 | Mooney |
| 3,817,097 A | 6/1974 | Heroux |
| 3,876,009 A | 4/1975 | Johnson, Jr. |
| 3,877,478 A | 4/1975 | Longworth |
| 3,896,850 A | 7/1975 | Waltrip |
| 3,898,555 A | 8/1975 | Tellerman |
| 3,928,848 A | 12/1975 | Banville |
| 3,938,384 A | 2/1976 | Blair |
| 3,940,020 A | 2/1976 | McCrory et al. |
| 3,969,923 A | 7/1976 | Howell |
| 3,978,709 A | 9/1976 | Ando |
| 4,043,355 A | 8/1977 | Cerruti et al. |
| 4,051,716 A | 10/1977 | Mooney |
| 4,058,802 A | 11/1977 | Meyers |
| 4,088,985 A | 5/1978 | Saito et al. |
| 4,088,987 A | 5/1978 | Resler et al. |
| 4,090,193 A | 5/1978 | Hinkle, Jr. |
| 4,096,747 A | 6/1978 | Gilson |
| 4,131,216 A | 12/1978 | Gerstenmaier et al. |
| 4,230,187 A | 10/1980 | Seto et al. |
| 4,275,759 A | 6/1981 | Huang |
| 4,300,388 A | 11/1981 | Hansel et al. |
| 4,349,042 A | 9/1982 | Shimizu |
| 4,360,038 A | 11/1982 | Trinkwalder, Jr. |
| 4,410,883 A | 10/1983 | Swiston, Sr. |
| 4,461,173 A | 7/1984 | Olin |
| 4,481,389 A | 11/1984 | Johnson |
| 4,489,754 A | 12/1984 | Seessle et al. |
| 4,517,838 A | 5/1985 | Wachi et al. |
| 4,518,955 A | 5/1985 | Meyer |
| 4,562,731 A | 1/1986 | Nishimura et al. |
| 4,571,996 A | 2/1986 | Wakeman et al. |
| 4,573,361 A | 3/1986 | Kobold |
| 4,574,836 A | 3/1986 | Barnard, Jr. |
| 4,586,033 A | 4/1986 | Andrejasich |
| 4,590,793 A | 5/1986 | Staats, Jr. |
| 4,599,890 A | 7/1986 | Girone et al. |
| 4,616,505 A | 10/1986 | Jouwsma |
| 4,624,443 A | 11/1986 | Eidsmore |
| 4,644,354 A | 2/1987 | Kidd |
| 4,646,069 A | 2/1987 | Andrejasich et al. |
| 4,648,270 A | 3/1987 | Johnson et al. |
| 4,665,945 A | 5/1987 | Suzuki |
| 4,672,842 A | 6/1987 | Hasselmann |
| 4,679,587 A | 7/1987 | Jarr |
| 4,712,648 A | 12/1987 | Mattes et al. |
| 4,721,950 A | 1/1988 | Andrejasich et al. |
| 4,727,748 A | 3/1988 | Horigome et al. |
| 4,736,193 A | 4/1988 | Slocum et al. |
| 4,740,777 A | 4/1988 | Slocum et al. |
| 4,749,167 A | 6/1988 | Gottschall |
| 4,750,705 A | 6/1988 | Zippe |
| 4,791,414 A | 12/1988 | Griess |
| 4,792,113 A | 12/1988 | Eidsmore |
| 4,797,666 A | 1/1989 | Baxter et al. |
| 4,805,701 A | 2/1989 | Mountford |
| 4,811,754 A | 3/1989 | Wilhelm |
| 4,817,415 A | 4/1989 | Mooney |
| 4,827,762 A | 5/1989 | Hasselmann |
| 4,847,599 A | 7/1989 | Imiolex et al. |
| 4,852,054 A | 7/1989 | Mastandrea |
| 4,874,012 A * | 10/1989 | Velie .............................. 137/557 |
| 4,876,530 A | 10/1989 | Hill et al. |
| 4,905,962 A | 3/1990 | Iljin |
| 4,916,948 A | 4/1990 | Inada et al. |
| 4,937,558 A | 6/1990 | Robinet et al. |
| 4,942,758 A | 7/1990 | Cofield |
| 4,942,763 A | 7/1990 | Harpster |
| 4,966,190 A | 10/1990 | Geisinger |
| 4,982,602 A | 1/1991 | Stiefel et al. |
| 4,986,206 A | 1/1991 | Knight et al. |
| 5,014,543 A | 5/1991 | Franklin et al. |
| 5,027,849 A | 7/1991 | Diesener |
| 5,042,290 A | 8/1991 | Geisinger |
| 5,050,634 A | 9/1991 | Fiechtner |
| 5,062,442 A | 11/1991 | Stenstrom et al. |
| 5,072,621 A | 12/1991 | Hasselmann |
| 5,078,006 A | 1/1992 | Maresca, Jr. et al. |
| 5,085,076 A | 2/1992 | Engelmann |
| 5,090,234 A | 2/1992 | Maresca, Jr. et al. |
| 5,091,716 A | 2/1992 | Nelson et al. |
| 5,102,012 A | 4/1992 | Foster |
| 5,103,410 A | 4/1992 | Slocum et al. |
| 5,131,262 A | 7/1992 | Wood et al. |
| 5,139,044 A | 8/1992 | Otten et al. |
| 5,157,958 A | 10/1992 | Geisinger |
| 5,158,207 A | 10/1992 | Van Daele |
| 5,159,829 A | 11/1992 | Mayer et al. |
| 5,163,314 A | 11/1992 | Maresca, Jr. et al. |
| 5,170,657 A | 12/1992 | Maresca, Jr. et al. |
| 5,189,904 A | 3/1993 | Maresca, Jr. et al. |
| 5,190,069 A | 3/1993 | Richards |
| 5,201,212 A | 4/1993 | Williams |
| 5,228,329 A | 7/1993 | Dennison |
| 5,228,469 A | 7/1993 | Otten et al. |
| 5,236,002 A | 8/1993 | Martin et al. |
| 5,272,646 A | 12/1993 | Farmer |
| 5,279,154 A | 1/1994 | Vavra et al. |
| 5,279,155 A | 1/1994 | Johnson et al. |
| 5,304,757 A | 4/1994 | Hensel |
| 5,309,762 A | 5/1994 | Satoh et al. |
| 5,315,862 A | 5/1994 | Hasselmann |
| 5,317,899 A | 6/1994 | Hutchinson et al. |
| 5,320,136 A | 6/1994 | Morris et al. |
| 5,325,706 A | 7/1994 | Grose |
| 5,330,073 A | 7/1994 | Collins et al. |
| 5,333,115 A | 7/1994 | Clouser et al. |
| 5,343,737 A | 9/1994 | Baumoel |
| 5,372,032 A | 12/1994 | Filippi et al. |
| 5,375,454 A | 12/1994 | Andrejasich et al. |
| 5,375,455 A | 12/1994 | Maresca, Jr. et al. |
| 5,377,529 A | 1/1995 | Boyd |
| 5,383,357 A | 1/1995 | Doll |
| 5,390,744 A | 2/1995 | McHugh |
| 5,408,420 A | 4/1995 | Slocum et al. |
| 5,410,912 A | 5/1995 | Suzuki |
| 5,419,203 A | 5/1995 | Carmichael |
| 5,421,193 A | 6/1995 | Carlin et al. |
| 5,423,457 A | 6/1995 | Nicholas et al. |
| 5,461,910 A | 10/1995 | Hodson et al. |
| 5,483,838 A | 1/1996 | Holden |
| 5,493,100 A | 2/1996 | Renger |
| 5,511,573 A | 4/1996 | Corte |
| 5,526,679 A | 6/1996 | Filippi et al. |
| 5,537,870 A | 7/1996 | Zurek et al. |
| 5,546,801 A | 8/1996 | Swinson et al. |
| 5,557,965 A | 9/1996 | Fiechtner |
| 5,568,825 A | 10/1996 | Faulk |
| 5,637,789 A | 6/1997 | Lawson |
| 5,671,774 A | 9/1997 | Klein et al. |
| 5,834,631 A | 11/1998 | Yamaguti et al. |
| 5,918,268 A | 6/1999 | Lukas et al. |
| 5,944,051 A | 8/1999 | Johnson |
| 5,970,797 A | 10/1999 | Hunter |
| 5,979,233 A | 11/1999 | Johnson |
| 6,000,417 A | 12/1999 | Jacobs |
| 6,058,775 A | 5/2000 | Levy |
| 6,081,196 A | 6/2000 | Young |
| 6,082,182 A | 7/2000 | Fierro et al. |
| 6,092,545 A | 7/2000 | Bedore et al. |
| 6,148,854 A | 11/2000 | Major et al. |
| 6,185,986 B1 | 2/2001 | Nelson et al. |
| 6,199,587 B1 | 3/2001 | Shlomi et al. |
| 6,239,708 B1 | 5/2001 | Young |
| 6,269,678 B1 | 8/2001 | Geisinger |
| 6,427,516 B2 | 8/2002 | Geisinger |
| 6,481,265 B1 | 11/2002 | Weber |

(56) References Cited

U.S. PATENT DOCUMENTS

| | | |
|---|---|---|
| 6,517,045 B1 | 2/2003 | Northedge |
| 6,585,000 B2 | 7/2003 | Radford |
| 6,591,864 B1 | 7/2003 | Denby |
| 6,648,012 B2 | 11/2003 | Linthorst |
| 6,721,669 B2 | 4/2004 | Köpl et al. |
| 6,741,179 B2 | 5/2004 | Young |
| 6,804,990 B2 | 10/2004 | Weber |
| 6,834,534 B2 | 12/2004 | Halla et al. |
| 6,914,531 B1 | 7/2005 | Young |
| 6,929,018 B2 | 8/2005 | Shepard et al. |
| 6,935,161 B2 | 8/2005 | Hutchinson |
| 6,935,356 B2 | 8/2005 | Shepard et al. |
| 6,935,364 B1 | 8/2005 | Tarazona et al. |
| 6,941,934 B2 | 9/2005 | Weldon et al. |
| 6,962,269 B2 | 11/2005 | Hutchinson |
| 6,970,793 B2 | 11/2005 | Pearson et al. |
| 6,975,964 B2 | 12/2005 | Reichler et al. |
| 7,028,533 B2 | 4/2006 | Koike et al. |
| 7,044,111 B2 | 5/2006 | Cook |
| 7,066,154 B2 | 6/2006 | Zdravkovic et al. |
| 7,070,161 B2 | 7/2006 | Piehl et al. |
| 7,086,383 B2 | 8/2006 | Ivens et al. |
| 7,171,981 B2 | 2/2007 | Shade et al. |
| 7,255,323 B1 * | 8/2007 | Kadhim .................. 251/65 |
| 7,278,443 B2 | 10/2007 | Larson |
| 7,290,561 B2 | 11/2007 | Larson |
| 7,296,474 B2 | 11/2007 | Shamine |
| 7,320,456 B2 | 1/2008 | Yajima |
| 7,455,194 B2 | 11/2008 | Hutchinson |
| 7,506,663 B2 * | 3/2009 | Thomas et al. .......... 137/529 |
| 7,726,524 B2 | 6/2010 | Merabet et al. |
| 2001/0038281 A1 | 11/2001 | Nyce et al. |
| 2005/0087558 A1 | 4/2005 | Reichler et al. |
| 2005/0139796 A1 | 6/2005 | Altonji |
| 2005/0205157 A1 | 9/2005 | Hutchinson |
| 2005/0248465 A1 | 11/2005 | Flaherty |
| 2006/0042690 A1 | 3/2006 | Aoki et al. |
| 2006/0097208 A1 * | 5/2006 | O'Brien ................... 251/65 |
| 2007/0084510 A1 | 4/2007 | Kaneko et al. |
| 2007/0163331 A1 | 7/2007 | Jarvie |
| 2007/0204676 A1 | 9/2007 | Kaplan |
| 2007/0284001 A1 | 12/2007 | Yamada |
| 2008/0006791 A1 | 1/2008 | Reinicke |
| 2008/0029070 A1 | 2/2008 | Yoshihara |
| 2010/0281953 A1 | 11/2010 | Jarvie |

FOREIGN PATENT DOCUMENTS

| | | |
|---|---|---|
| DE | 37 27 831 | 3/1989 |
| EP | 0 351 061 | 1/1990 |
| JP | 2004-132809 | 4/2004 |
| RU | 2 015 440 | 6/1994 |
| WO | 93/14020 | 7/1993 |
| WO | 99/28722 | 6/1999 |

OTHER PUBLICATIONS

Sergey A. Dorofeev; English translation of Decision on Grant issued by the Patent Office of the Russian Federation in related Russian Patent Application No. 2010118496(026250); Jan. 25, 2011; 14 pages; Russian Patent Office.

David A. Rogers; Office Action issued in priority U.S. Appl. No. 12/437,759; Sep. 12, 2011; 47 pages; U.S. Patent and Trademark Office.

Daniel Sean Larkin; Office Action issued in related U.S. Appl. No. 11/623,525; Apr. 8, 2009; 8 pages; U.S. Patent and Trademark Office.

Kerem Dogueri; Office Action issued in related European Patent Application No. 07 710 160.8; Oct. 28, 2008; 3 pages; European Patent Office.

Kerem Dogueri; International Search Report issued in related International Application No. PCT/US2007/060619; Jun. 18, 2007; 11 pages; European Patent Office.

MTS Sensors; Temposonics®; Magnetostrictive Linear-Position Sensors; 1 page; XP-2436025A.

International Searching Authority, Search Report and Written Opinion issued in corresponding PCT/US2012/063832 dated Jan. 24, 2013, 8 pages.

Series ARV Thermoplastic Air Release Valves, Plast-O-Matic Valves, Inc., located on http://www.archive.org, archived on Mar. 17, 2005.

* cited by examiner

LINE LEAK DETECTOR AND METHOD OF USING SAME

This application is a continuation-in-part of U.S. patent application Ser. No. 12/437,759, filed on May 8, 2009, which is incorporated by reference herein in its entirety.

TECHNICAL FIELD

This invention relates to leak detection and has particular application to the detection of leakage from pressurized fuel delivery lines in dispensing operations, such as gas stations.

BACKGROUND

Leakage into the environment of petroleum products, including gasoline, may be damaging to surrounding soil and water. Once a leak is detected, clean up or remediation may be costly and time consuming. Thus, it is desirable to identify leaks as early as possible.

In a dispensing operation, such as a gas station, fuel is typically stored in underground storage tanks ("UST") from where it is pumped through various conduit lines to an above ground dispensing unit for dispensing into motor vehicles or the like. Leaks of fuel from the tank or from the interconnecting conduit lines to the dispensers can cause significant environmental damage. The United States Environmental Protection Agency ("EPA"), as well as regulatory bodies in many foreign countries, have set certain standards for the detection and prevention of environmental leaks of fuel. For example, as this application is filed, the EPA requires detection methods sufficient to detect volumetric leak rates of 0.1 gallons per hour (gph). It accordingly has been a goal of manufacturers of this equipment to detect leaks and to meet EPA standards in this regard.

A number of devices operating on a variety of physical principles have been proposed to meet these standards and thereby warn of leaks and provide means for stopping the leaks as quickly as possible to reduce the impact on the surrounding environment. By way of example, in fuel dispensing operations, one such type of leak detector device includes a valve disposed in the conduit line having a spring-biased valve element movable toward and away from an associated valve seat. When the pressure drop across the valve element reaches a certain threshold, the valve element moves away from the valve seat against the spring force to allow fluid to flow through the valve and toward a dispensing unit, from where the fuel is dispensed to a motor vehicle or the like. When the dispensing unit is closed or turned off, the pressure drop across the valve element equalizes and the spring force urges the valve element back toward the valve seat and into a closed position so as to prevent any fuel from passing through the valve.

The leak detection function of these devices is typically provided by a bypass line around the valve such that one end thereof is in fluid communication with a first side of the valve (e.g., downstream side) and the other end of the bypass line is in fluid communication with a second side of the valve (e.g., upstream side). A flow detector is typically disposed in the bypass line so as to detect any flow therethrough. Additionally, the bypass line typically has a relatively small cross-sectional area relative to the primary flow path through the valve so as to allow relatively small leaks in the conduit line to be detected.

In operation, when the dispensing unit shuts off (such as after a filling operation), fluid pressure on each side of the valve equalizes and the valve closes. Ideally there is no leak in the conduit line and thus no flow through the bypass line. If, however, there is a leak in the conduit line downstream of the valve, the pressure in the downstream conduit line will steadily decrease. This pressure drop will, in turn, cause fluid to flow from the upstream side of the valve (e.g., high pressure side) to the downstream side of the valve (e.g., low pressure side) through the bypass line. The flow detector will then detect this flow through the bypass line and cause an alarm condition which may shut down the dispensing system to prevent any further leakage of fuel from the conduit line and to the surrounding environment.

Leak detection devices operating on the basic principles outlined above are generally known in the art. By way of example, U.S. Pat. No. 3,940,020 to McCrory et al.; U.S. Pat. No. 3,969,923 to Howell; U.S. Pat. No. 5,014,543 to Franklin et al.; U.S. Pat. Nos. 5,072,621 and 5,315,862 to Hasselmann; and U.S. Pat. No. 5,918,268 to Lukas et al. generally show a valve, a bypass line, and some type of flow detector for detecting flow through the bypass line. These references differ primarily in the flow detector used to detect flow through the bypass line. For example, McCrory et al. and Howell use a reed switch in conjunction with a magnetized piston to sense flow through the bypass line. Franklin et al. use a rotometer to measure the fluid flow through a bypass line. Moreover, Lukas et al. utilize a thermal flow meter that operates on generally well know principles for determining the flow through the bypass line.

While the leak detectors described above generally operate for their intended purpose, there are some drawbacks that make the use of such devices problematic in fuel dispensing operations. For example, such leak detectors generally represent a "choke point" in the overall dispensing system that restricts the delivery of fuel to the dispensing unit. As a result, the delivery of fuel to motor vehicles or the like may appear relatively slow, leading to increased dispense times and increased customer dissatisfaction. Additionally, the effects of such flow restriction may be exacerbated when there are multiple users on a single fluid conduit line.

The flow restriction through these types of devices is believed to be due to the multi-function nature of the return mechanism used in the valve. In many of these prior leak detection devices, for example, a spring is used to urge the valve element toward the closed position. In addition, the spring also retains the valve element in the closed position until the pressure drop across the valve element reaches the threshold level and thereby moves the valve element away from the valve seat. Furthermore, the spring may ensure proper seating of the valve element in the valve seat when the valve element is moved to the closed position. As a result of such a multi-function mechanism, the spring constant of the spring is typically relatively high. The relatively high spring constant not only results in a large pressure drop to initiate movement of the valve element (e.g., cracking pressure) away from the valve seat, but also requires an even larger pressure drop to sustain the valve element in the opened position as the spring elongates (e.g., linear spring). Thus, the spring works against the flow of fluid through the valve and, for a given operating pressure (determined by the submersible pump in the tank), operates to limit the flow therethrough.

Consequently, there is a need for an improved line leak detector that cannot only detect small leaks in a fluid conduit line so as to meet or exceed EPA standards, but also does so while eliminating or minimizing any restriction of flow through the leak detector.

SUMMARY

To address these and other drawbacks, an apparatus for detecting a leak in a fluid conduit line includes a housing configured to be in fluid communication with the fluid conduit line and a valve including a valve seat coupled to the housing and a valve element movable relative to the valve seat between an opened position wherein fluid is permitted to flow through the valve, and a closed position wherein fluid is prevented from flowing through the valve. A bypass line is provided and includes a first end in fluid communication with a first side of the valve and a second end in fluid communication with a second side of the valve. A fluid flow detector is operatively coupled to the bypass line and configured to detect the flow of fluid therethrough. The apparatus includes a mechanism configured to provide a return force on the valve element when the valve element is immersed in the fluid flowing through the conduit line. The return force is configured to urge the valve element toward the closed position, and the return force decreases as the valve element is moved away from the closed position.

In one embodiment, the mechanism may include a first magnetic member and a second magnetic member, which may, for example, be coupled to the valve element and the housing, respectively. The magnetic attraction force may be between approximately 0.0625 pounds-force (lbf) (0.28 Newtons (N)) and approximately 1.0 lbf (4.45 N) in the open position. Other values and ranges are possible, however, depending on the specific application.

The mechanism may be configured to maintain the valve element in the closed position until a threshold pressure drop across the valve element is reached. The first and second magnetic members may be in proximity to each other when the valve element is in the closed position. The first and second magnetic members may include, for example, permanent magnets, electromagnets, and materials attracted to such magnets. In one exemplary embodiment, the first magnetic member includes a portion of the valve element formed of a material attracted to a magnet and the second magnetic member includes a permanent magnet. The threshold pressure for moving the valve element away from the closed position may be between approximately one-half (0.5) pound per square inch (psi) and approximately five (5) psi.

In another embodiment, an apparatus for detecting a leak in a fluid conduit line includes a housing having an inlet, an outlet, and an interior cavity, and a valve disposed at least in part in the interior cavity between the inlet and outlet. The valve includes a valve seat coupled to the housing and a valve element movable relative to the valve seat between an opened position wherein fluid is permitted to flow through the valve, and a closed position wherein fluid is prevented from flowing through the valve. A bypass line is provided and includes a first end in fluid communication with a first side of the valve and a second end in fluid communication with a second side of the valve. A fluid flow detector is operatively coupled to the bypass line and configured to detect the flow of fluid therethrough. The apparatus further includes a single mechanism configured both to urge the valve element toward the closed position and to maintain the valve element in the closed position until a threshold pressure drop across the valve element is reached. The mechanism includes a first magnetic member and a second magnetic member, and the mechanism is the sole mechanism urging the valve element toward the closed position and maintaining the valve element in the closed position until a threshold pressure drop across the valve element is reached.

In one embodiment, the mechanism may include a first magnetic member coupled to the valve element and a second magnetic member coupled to the housing. Additionally, the magnet may be configured to provide a variable force on the valve element. More particularly, the mechanism may be configured so as to provide a force on the valve element when in the closed position having a magnitude, and the magnitude of the force decreasing as the valve element moves toward the opened position. In one embodiment, the magnitude of the force provided by the mechanism is non-negligible when the valve element is in the opened position.

In another embodiment, a dispensing system includes a tank for holding a liquid, a dispensing unit for dispensing the liquid, a fluid conduit line providing fluid communication between the tank and the dispensing unit, and a line leak detector in fluid communication with the fluid conduit line and configured to detect a leak therein. The leak detector includes a housing having an inlet, an outlet, and an interior cavity, and a valve disposed at least in part in the interior cavity between the inlet and outlet. The valve includes a valve seat coupled to the housing and a valve element movable relative to the valve seat between an opened position wherein liquid is permitted to flow through the valve, and a closed position wherein liquid is prevented from flowing through the valve. A bypass line is provided and includes a first end in fluid communication with a first side of the valve and a second end in fluid communication with a second side of the valve. A fluid flow detector is operatively coupled to the bypass line and configured to detect the flow of liquid therethrough. The apparatus further includes a mechanism configured to provide a return force on the valve element when the valve element is immersed in the fluid flowing through the fluid conduit line. The return force is configured to urge the valve element toward the closed position, and the return force decreases as the valve element is moved away from the closed position.

BRIEF DESCRIPTION OF THE DRAWINGS

The accompanying drawings, which are incorporated in and constitute a part of this specification, illustrate embodiments of the invention and, together with a general description given above, and the detailed description given below, serve to explain various aspects of the invention.

DETAILED DESCRIPTION

Figure 1:
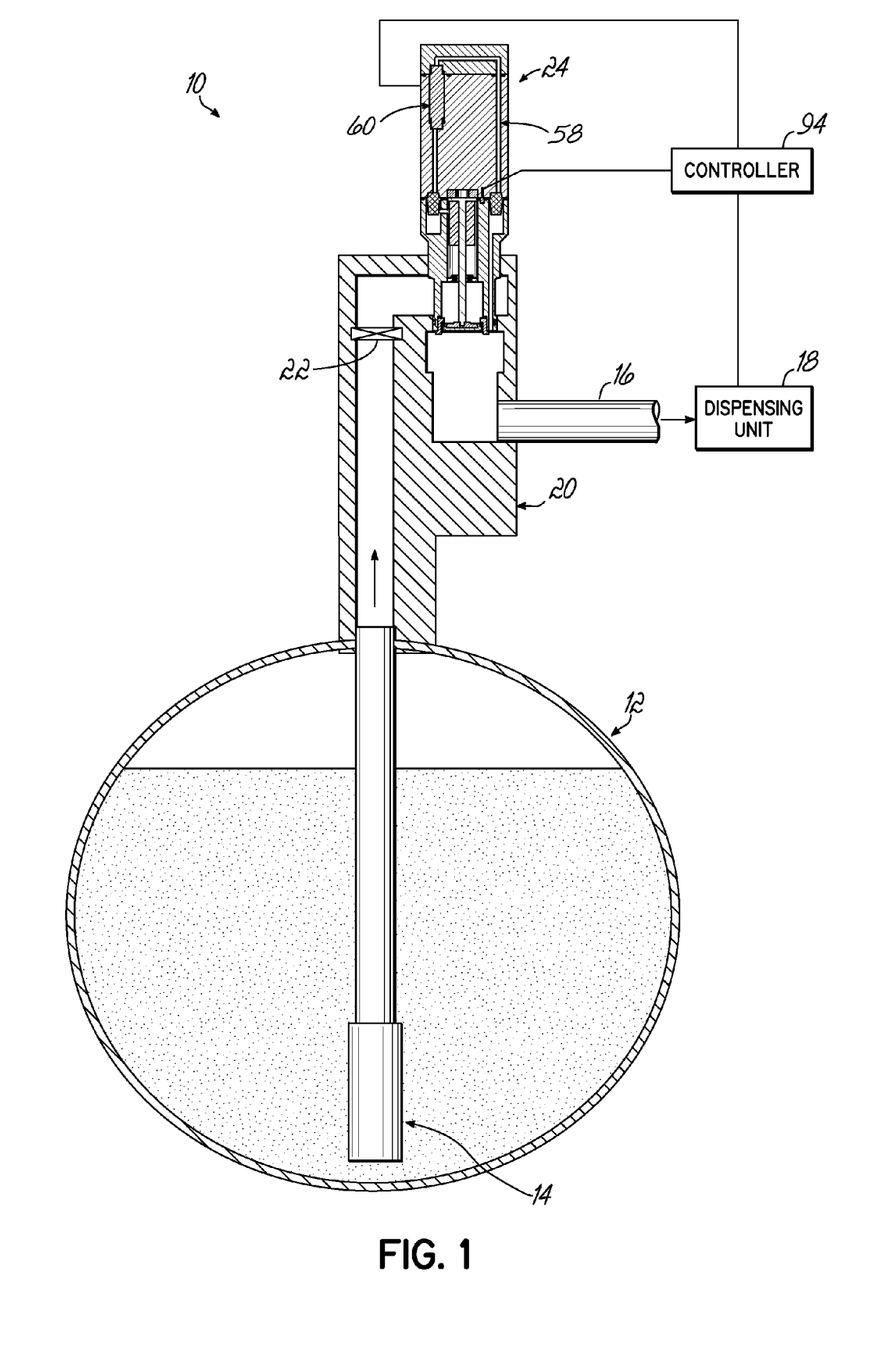
FIG. 1 is a diagrammatic illustration of an exemplary fuel dispensing system including a line leak detector in accordance with an embodiment of the invention.

An exemplary fuel dispensing system 10 in accordance with embodiments of the invention is shown in FIG. 1 and generally includes an underground storage tank ("UST") 12 for storing a fuel, a submersible pump 14 located in the tank 12, and a fluid conduit line 16 that transports the fuel under pressure to one or more dispensing units 18, shown schematically in FIG. 1. Typically, the fluid conduit line 16 is coupled to the submersible pump 14 via a pump manifold 20 that is typically located external to tank 12, such as in a covered manway (not shown). Pump manifold 20 may include a check valve 22 for preventing fuel from flowing back into tank 12. Because check valve 22 prevents any fuel from flowing back into tank 12, when the dispensing unit 18 is off or closed thus preventing fuel from flowing from conduit line 16, the fluid conduit line 16 defines a closed system containing an amount or volume of fuel that depends on several factors, including length of conduit line 16, size of conduit line 16 (e.g., cross-sectional area), and other factors. As mentioned above, to meet EPA regulations, the integrity of the fluid conduit line 16 is regularly tested and the amount of any fuel leakage therefrom monitored. In this regard, the fuel dispensing system 10 includes a line leak detector, generally shown at 24, for determining fuel leakage, if any, from conduit line 16.

Figure 2:
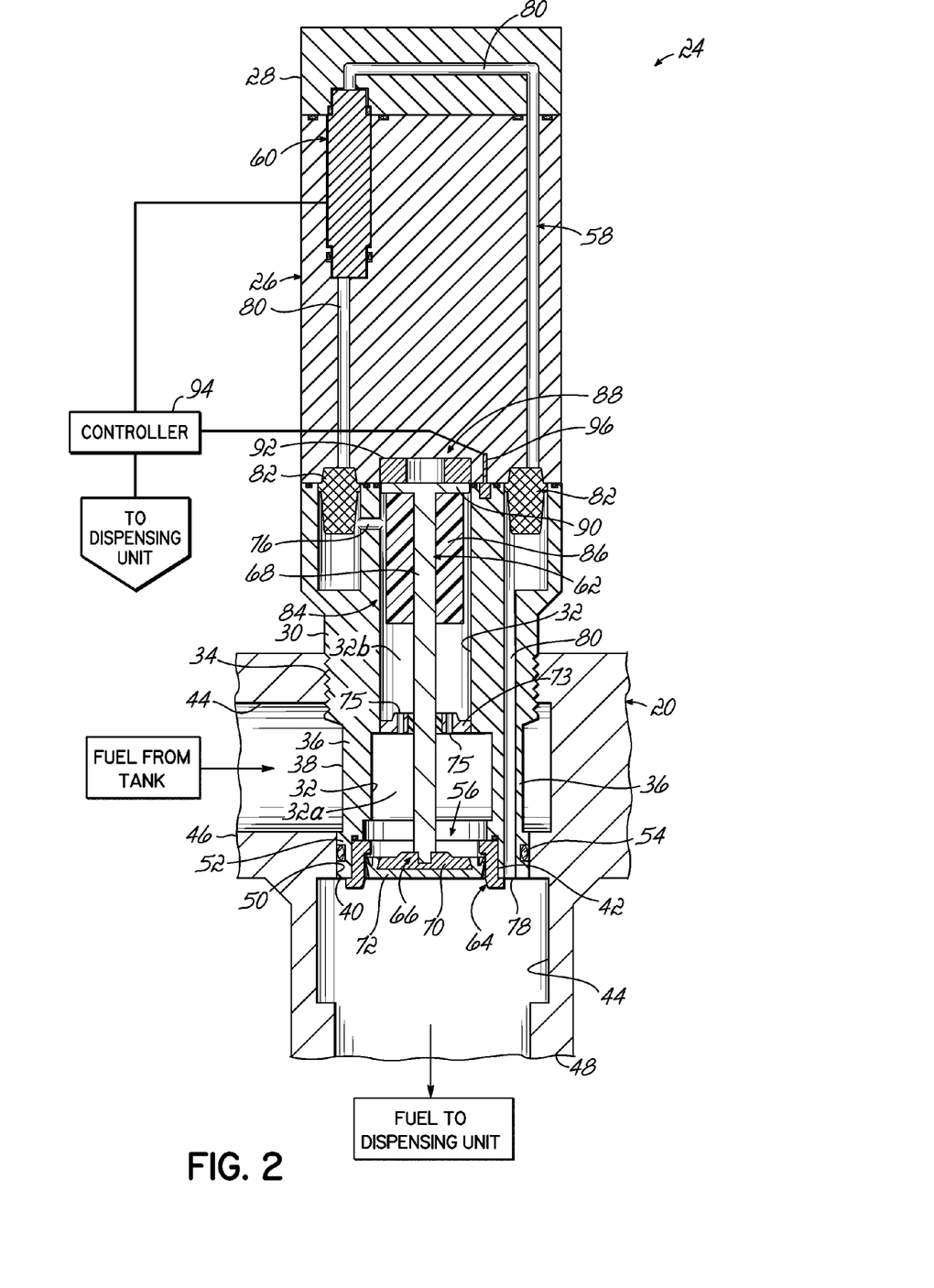
FIG. 2 is a cross-sectional view of the line leak detector shown in FIG. 1 in a closed position.
Figure 3:
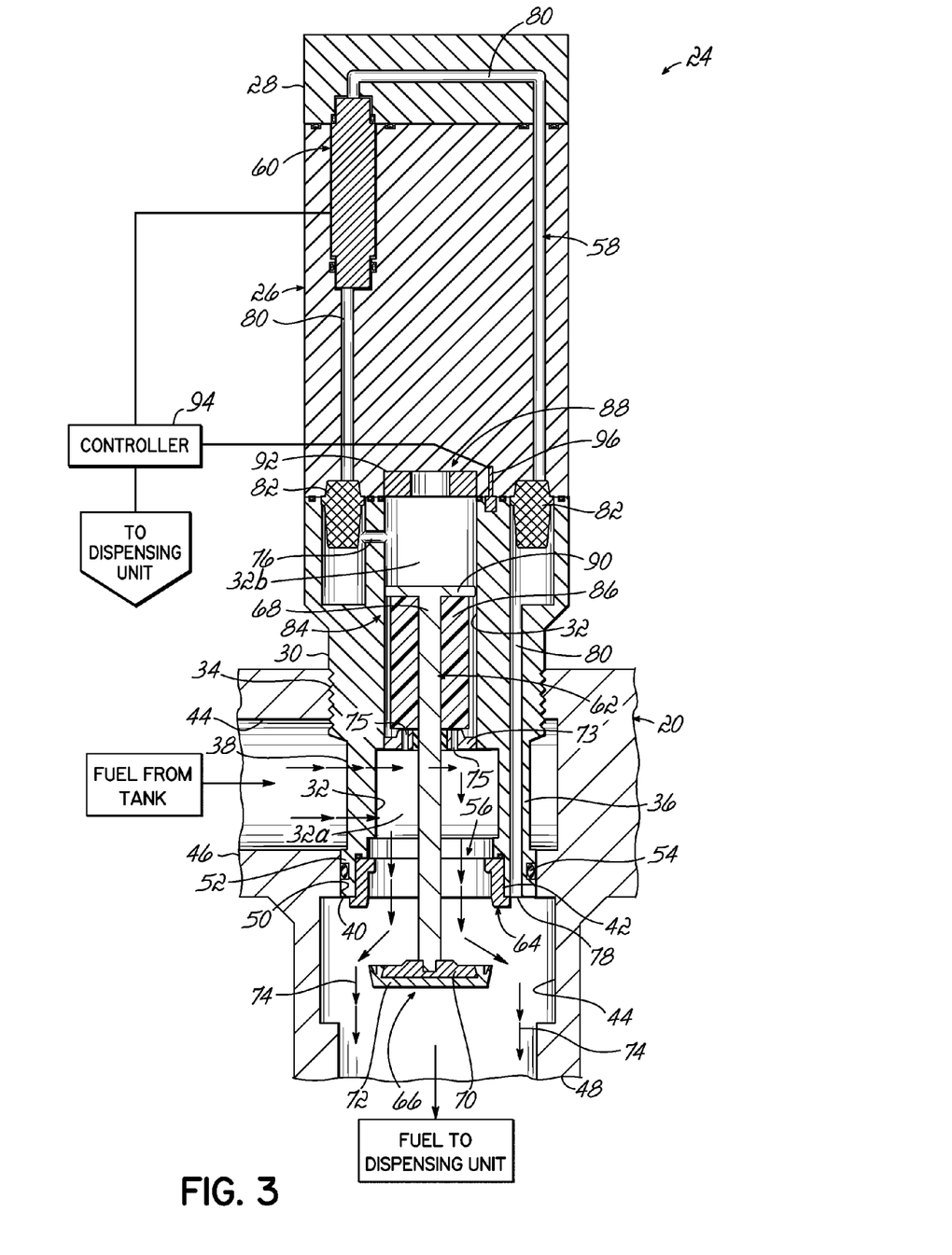
FIG. 3 is a cross-sectional view of the line leak detector shown in FIG. 2 but in the opened position.
Figure 4:
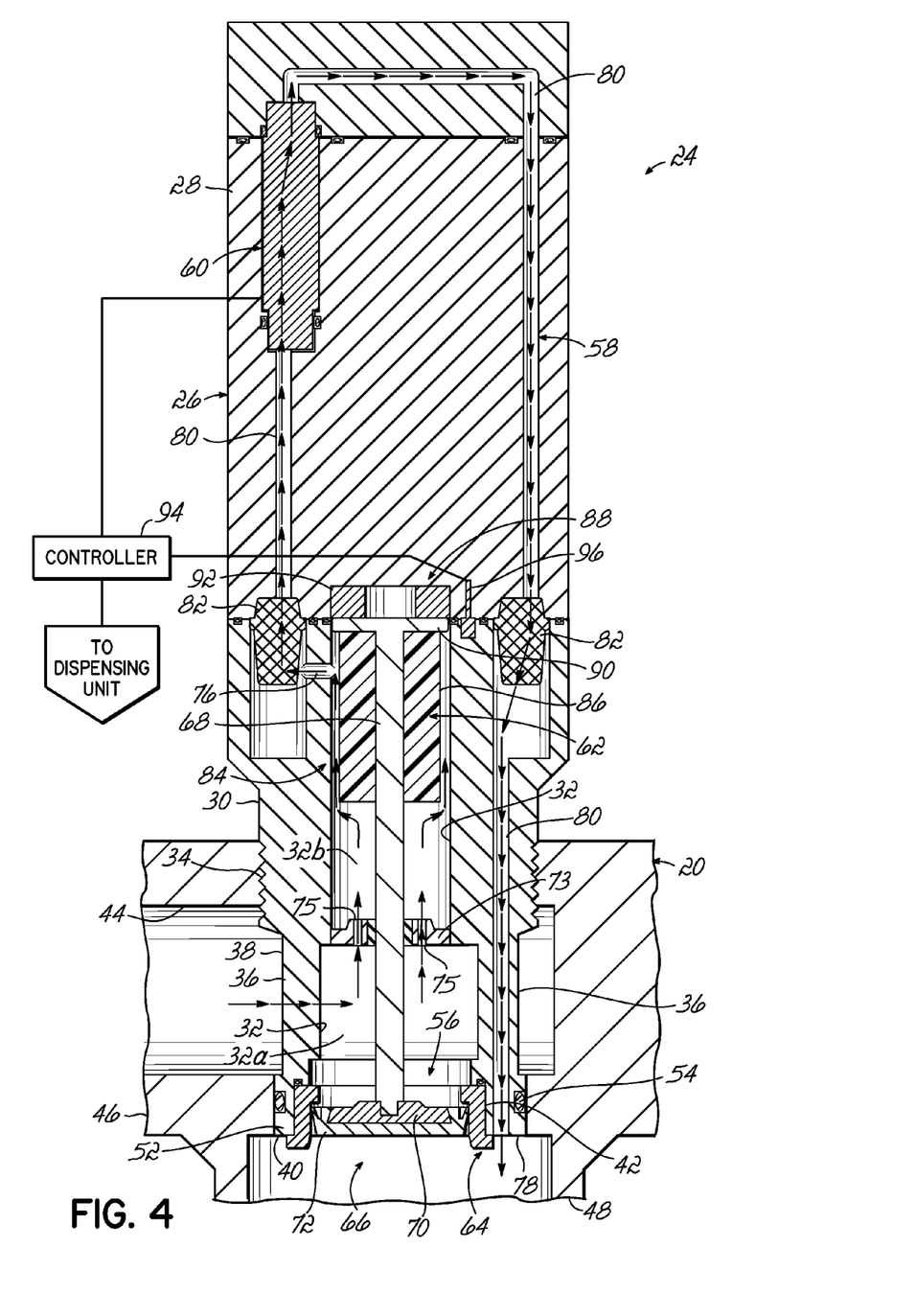
FIG. 4 is a cross-sectional view of the line leak detector shown in FIG. 2 illustrating operation of the leak detector on the occurrence of a leak.

As shown in FIGS. 2-4, leak detector 24 includes a generally cylindrical body or housing 26 having a proximal end portion 28, a distal end portion 30 and an interior cavity or bore 32. The housing 26 may have a unitary construction, or alternatively may be configured as a multi-part structure that among other things, facilitates assembly and maintenance of leak detector 24. The distal end portion 30 is adapted to be coupled to a port 34 in pump manifold 20 and may, for example, include a set of external threads that cooperate with a corresponding set of internal threads in port 34 to threadably couple leak detector 24 with pump manifold 20. The external threads on housing 26 are generally proximal of a distal end of the leak detector 24 such that a portion of leak detector 24 extends into the pump manifold 20 and in particular, into a flow passage thereof as discussed below. The invention is not limited to the threaded connection described herein, however, as those of ordinary skill in the art will recognize other ways to couple leak detector 24 with pump manifold 20. Those of ordinary skill in the art will further recognize that the leak detector 24 is not limited to being coupled to pump manifold 20, but may be positioned at any point along the fluid conduit line 16 generally between the check valve 22 and the dispensing unit 18.

The distal end portion 30 of leak detector 24 includes at least one, and preferably a plurality of openings 36 (e.g., longitudinal slots) formed in the side wall 38 of housing 26 so as to provide fluid communication between the tank 12 and the interior bore 32 of leak detector 24. Moreover, a distal end wall 40 of leak detector 24 includes an opening 42 so as to provide fluid communication between the dispensing unit 18 and the interior bore 32 of leak detector 24 (via fluid conduit line 16).

As shown in FIGS. 2-4, pump manifold 20 includes a primary flow channel 44 having a first upstream end 46 in fluid communication with the tank 12, and a second downstream end 48 in fluid communication with dispensing unit 18 via fluid conduit line 16. As used herein, upstream refers to a location nearer to the tank 12 (and consequently submersible pump 14) along a flow path, and downstream refers to a location further from the tank 12 along the flow path. When the leak detector 24 is coupled to pump manifold 20, the openings 36 in side wall 38 and opening 42 in end wall 40 are in fluid communication with primary flow channel 44. Additionally, the flow channel 44 includes an orifice 50 into which a mating portion 52 of the leak detector 24 is received in a fluid tight manner. By way of example, the mating portion 52 may be positioned adjacent a distal end of the leak detector 24. The invention, however, is not so limited as the mating portion 52 may be located at other locations of leak detector 24, such as being spaced from the distal end thereof, for example. The mating portion 52 of the leak detector 24 is sized to be slightly smaller than the orifice 50 and includes a seal, such as an O-ring 54 or other suitable seal, for creating a fluid tight interface between the housing 26 and the wall that defines orifice 50 of pump manifold 20.

In this way, fluid flow between the tank 12 and dispensing unit 18 passes through the interior bore 32 of leak detector 24. More particularly, as a result of the configuration described above, submersible pump 14 drives pressurized fluid from tank 12 into the upstream end 46 of pump manifold 20 and into the primary flow channel 44. The pressurized fluid then flows through the openings 36 in the side wall 38 of housing 26 and into interior bore 32. The fluid is then directed through the opening 42 in the end wall 40 of housing 26 and back into the flow channel 44 of pump manifold 20. Fluid then exits pump manifold 20 through downstream end 48 and flows through fluid conduit line 16 to the dispensing unit 18.

With the fluid flow between the tank 12 and the dispensing unit 18 being directed through the interior bore 32 of leak detector 24 (e.g., the entire flow between tank 12 and dispensing unit 18 has been isolated so as to flow through the leak detector), the leak detector 24 may include additional components adapted to facilitate the detection of a leak in conduit line 16. In this regard, leak detector 24 generally includes a valve 56, a bypass line 58, and a fluid flow detector 60. The valve 56 controls fluid flow through the leak detector 24 and includes an opened position wherein fluid is permitted to flow through the valve 56, and a closed position wherein fluid is prevented from flowing through the valve 56 through its primary flow path. The bypass line 58 provides an alternative fluid flow path that bypasses or circumvents the valve 56 such that fluid (albeit a relatively small amount) is capable of flowing between the tank 12 and dispensing unit 18, even when the valve 56 is in the closed position, such as during a leak. The flow detector 60 is configured to detect the fluid flow through the bypass line 58.

In one embodiment, the valve 56 may be disposed adjacent mating portion 52, although not so limited, and includes a valve element 62 capable of moving relative to a valve seat 64 to define the opened and closed positions of valve 56. In the opened position, the valve element 62 is spaced from the valve seat 64 so as to allow fluid to flow through the valve 56 and thus through leak detector 24. In the closed position, the valve element 62 is engaged with the valve seat 64 to prevent any flow through the valve 56 and through leak detector 24 (at least under a normal, no leak condition). As shown in FIGS. 2-4, the valve seat 64 may be disposed in the opening 42 in the end wall 40 of leak detector 24 and coupled to housing 26 thereof. In one embodiment, the valve seat 64 may be integrally formed with the housing 26 and generally be formed of the same material including, for example, aluminum, steel, plastics, combinations thereof, and other suitable materials. However, in an alternative embodiment, the valve seat 64 may be configured as a separate element or insert and coupled with the housing 26, such as by welding, bonding, fasteners, or other suitable connectors as recognized by those of ordinary skill in the art. Additionally, the housing 26 and valve seat 64 may be formed of different material. Thus, for example, in one embodiment, the housing 26 may be formed of the materials identified above and the valve seat 64 may be formed of one or more of those materials (but different than the material of the housing), brass, and other suitable materials. In any event, the valve seat 64 generally provides a smooth or otherwise prepared surface that facilitates mating with the valve element 62 to form a fluid tight interface.

The valve element 62 is movable relative to the valve seat 64 and includes a piston 66 and a stem 68 coupled to piston 66 and extending therefrom. The valve element 62 is arranged such that the stem 68 is positioned in the interior bore 32 of housing 26. In one embodiment, the piston 66 includes a generally rigid support 70 to provide a structural aspect to piston 66, and a seal 72 that engages valve seat 64 to provide a fluid tight interface. Rigid support 70 may be formed from aluminum, steel, plastic, such as polyoxymethylene (POM) (sold as Delrin®), or other suitable materials as recognized by those of ordinary skill in the art. Moreover, seal 72 may be a lip seal, O-ring, cup seal, or other suitable seal for forming a fluid tight interface with valve seat 64. The seal 72 may substantially encase the rigid support 70 or be coupled thereto along selective portions, such as along the periphery of support 70. In one embodiment, stem 68 may be integrally formed with rigid support 70 and generally be formed of the same material. Alternatively, the stem 68 may be a separate component that is coupled to rigid support 70, such as by welding, bonding, fasteners, etc., and be formed of a different material than rigid support 70, such as aluminum, steel, plastic, or other suitable materials.

As shown in FIG. 2, in the closed position, the piston 66 is disposed adjacent the valve seat 64 such that the seal 72 engages a surface thereof to form a fluid tight interface. In this way, fluid flow between the tank 12 and dispensing unit 18 through the valve 56 is prevented. In the opened position, however, and as shown in FIG. 3, the piston 66 has been moved away from the valve seat 64. More particularly, in one embodiment, the piston 66 moves beyond the distal end of the housing 26 so as to extend into the flow channel 44 of the pump manifold 20. In this way, and as illustrated by arrows 74, fluid is permitted to flow from the tank 12 to the dispensing unit 18 through the primary flow path of valve 56. In addition to performing other functions, discussed in more detail below, the stem 68 helps guide and/or facilitates proper alignment of the piston 66 relative to the valve seat 64 as the piston 66 moves between the opened and closed positions. In this regard, housing 26 may include a radially extending flange 73 closely spaced about stem 68. A seal may be disposed between the stem 68 and flange 73 to support the stem 68, but not hinder movement thereof relative to flange 73. For purposes described below, flange 73 may include one or more openings 75 to provide fluid communication between bore portions 32*a* and 32*b*.

As noted above, in addition to the primary flow path through the valve 56 of leak detector 24, as illustrated by arrows 74, the leak detector 24 includes an alternative flow path through the bypass line 58 that is configured to circumvent the valve 56. The bypass line 58 includes a first inlet end 76 positioned upstream of valve 56, a second outlet end 78 positioned downstream of the valve 56, and a fluid passageway 80 extending therebetween so that the inlet and outlet ends 76, 78 are in fluid communication. As shown in FIGS. 2-4, the inlet end 76 is in fluid communication with the interior bore 32 of housing 26, such as at a proximal end thereof (e.g., bore portion 32*b*). Those of ordinary skill will recognize that other locations are possible so long as the inlet end 76 is upstream of the valve 56. The outlet end 78 is disposed in distal end wall 40 and adjacent opening 42. The piston 66 does not occlude or otherwise interfere with outlet end 78. In this way, fluid is capable of flowing through bypass line 58 even though the valve element 62 is in the closed position, as will be discussed in more detail below.

To detect relatively small leaks in the dispensing system 10, the cross-sectional area of the bypass line 58 is generally less than the minimum cross-sectional area along the primary flow path through the leak detector 24. For example, the minimum cross-sectional area along the primary flow path may be defined by the opening in valve seat 64. In this way, small flow rates through bypass line 58 (resulting from a small leak downstream of leak detector 24, such as in conduit line 16) may be sensed and, if desired, metered, using current instrumentation in an accurate and reliable manner. By way of example, it is contemplated that the opening defined by valve seat 64 may have a cross-sectional area between approximately seven (7) square centimeters ($cm^2$) and approximately ten (10) $cm^2$. This range is exemplary and those of ordinary skill in the art may readily determine the cross-sectional area depending on the specific application and/or other factors. For this cross-sectional area range, and in further view of the particular design of leak detector 24, as discussed in more detail below, it is believed that leak detector 24 may accommodate flow rates between approximately thirty-five (35) gallons per minute (gpm) and approximately eighty (80) gpm in a normal operating mode.

Furthermore, it is contemplated that the bypass line 58 (e.g., passageway 80) may generally have a cross-sectional area of between approximately one-half (0.5) square millimeters ($mm^2$) and four (4) $mm^2$. This range is also exemplary and those of ordinary skill in the art may readily determine the cross-sectional area of bypass line 58 depending on the specific application and/or other factors. For this cross-sectional area range, however, and in further view of the flow detectors currently available, as discussed in more detail below, it is believed that flow rates as little as one-half (0.5) gph or below may be detected flowing through bypass line 58. The ability to detect such relatively low flow rates through bypass line 58 allows leak detector 24 to detect a leak in dispensing system 10 that meets (and exceeds) current EPA standards.

In addition to the above, to prevent any dirt or other debris carried by the fluid to occlude or block the bypass line 58, the bypass line may include at least one (two shown) filter 82 configured to remove such debris and prevent or reduce the likelihood of blockage of bypass line 58. Such filters 82 may include sintered brass filters, for example, and are commercially available from a wide variety of vendors. As noted above, the housing 26 may have a multi-part construction that allows the filters 82 to be conveniently installed therein, as well as to allow replacement of filters 82 in a relatively quick and easy manner.

The flow detector 60 is operatively coupled to the bypass line 58 to detect fluid flowing therethrough. As used herein, flow detector 60 may include any such device capable of sensing fluid flow through bypass line 58 (e.g., fluid flow sensor) or quantifying fluid flow through bypass line 58 (e.g., fluid flow meter). Flow detector 60 may quantify fluid flow using any acceptable metric including volume, velocity, mass flow rate, volume flow rate, etc. Those of ordinary skill in the art will recognize a wide range of flow detectors which may be used in leak detector 24, and which implement a wide range of technologies. By way of example, and without limitation, in one exemplary embodiment, a thermal flow detector may be utilized. In this regard, a thermal flow detector available from Sensirion, Inc. of Westlake Village, Calif. may be used in leak detector 24. Alternatively, the thermal sensor described above is exemplary and other thermal flow sensors/ meters, such as hot wire anemometers, may also be used. In addition, flow detectors based on other technologies may also be used to detect fluid flow through the bypass line 58. These include without limitation, ultrasonic flow meters, coriolis flow meters, positive displacement meters, turbine meters, and other devices suitable for sensing or quantifying flow through a conduit.

Many prior leak detectors utilize a spring to perform multiple functions, including, for example: i) retaining a valve element in a closed position until a threshold pressure drop across the valve element is reached; ii) ensuring proper seating of the valve element in a valve seat as the valve element is moved toward the closed position; and iii) providing a force that urges the valve element toward the closed position. However, for reasons discussed above, using a single mechanism (e.g., spring) for these multiple functions results in a device that restricts the flow of fluid through the leak detector. To address such a shortcoming in prior leak detectors, leak detector 24 performs the functions outlined above, but in a manner completely different to a conventional spring.

In accordance with aspects of an embodiment of the invention, leak detector 24 utilizes two separate mechanisms for performing one or more of the functions outlined above. One mechanism, for example, ultimately provides a force that urges the valve element 62 toward the closed position. Another mechanism provides a force for retaining the valve element in the closed position until a threshold pressure drop across the valve element is reached. This mechanism may also ensure proper seating of the valve element in the valve seat. These two mechanisms, their operation, and how they overcome the flow restriction of conventional spring-based leak detectors will now be discussed.

A first mechanism, generally shown at 84, for providing a force that urges the valve element 62 toward the valve seat 64 operates on the principle of buoyancy. This is in sharp contrast to a spring, which relies on elastic deformation of a structural element (e.g., elongation of the spring) to provide a restoring force. In this regard, first mechanism 84 includes a float 86 operatively coupled to the valve element 62. By way of example, in one embodiment and as shown in FIGS. 2-4, the float 86 may be coupled to the stem 68 of valve element 62, such as by a friction fit, bonding, fasteners, etc. In alternative embodiments, the float 86 may be coupled to the valve element 62 at other locations, such as at piston 66 (not shown). The float 86 may have a hollow body configuration that collectively has a density less than that of the surrounding fluid (e.g., fuel), as known to those of ordinary skill in the art. Alternatively, the float 86 may be a solid body (or hollow body) formed from suitable materials that float in the fluid. In one embodiment, for example, float 86 may be formed from a suitable foam (e.g., Nitrophyl®). The size and/or configuration of float 86 is such that the valve element assembly (i.e., collectively the valve element 62 and float 86) has a net positive buoyant force when the assembly is immersed in fuel during use (e.g., the buoyant force is greater than the weight of the assembly to give a net force acting in the upward direction as viewed in FIGS. 2-4). Those of ordinary skill in the art will recognize how to configure float 86 so as to give the valve element assembly this net positive buoyancy force.

In general, the net positive buoyant force is configured to move the valve element assembly toward the closed position when there is substantially no flow through the dispensing system 10 (i.e., no leak) in conduit line 16, and dispensing unit 18 is closed. Moreover, the net positive buoyant force may be further configured to move the valve element assembly toward the closed position even when there is a small leak in the dispensing system 10. For example, the net positive buoyant force may be configured to move the valve element assembly toward the closed position for a leak in conduit line 16 having a leakage rate up to a value substantially equal to the maximum flow rate capable of flowing through the bypass line 58 under pump pressure. This will allow the valve element 62 to close even when a small leak exists, such that fluid then flows through the bypass line 58 and detected by flow detector 60. In one embodiment, the net positive buoyant force on the valve element assembly is between approximately 0.0625 lbf (0.28 N) and approximately 0.5 lbf (2.22 N). These values, however, are exemplary and different values/ranges may be used depending on the specific application.

While the first mechanism 84 is sufficient to provide a net positive buoyant force that urges the valve element 62 toward the closed position, this net force is relatively weak and may not be sufficient to maintain the valve element 62 in the closed position until a suitable threshold pressure drop is imposed across valve element 62. In other words, for some applications, the valve 56 may too easily open. Additionally, this relatively weak net force may not facilitate proper seating of the valve element 62 in valve seat 64. In applications where these aspects are not a particular concern, the leak detector 24 may only include this first mechanism 84. If, however, these aspects are of some concern or if simply desired in certain applications, the leak detector 24 may include a second mechanism, generally shown at 88, that addresses these functions in a manner that maintains the positive aspects of the first mechanism 84.

In one aspect, the second mechanism 88 may be configured to operate in a local manner as opposed to a global manner. In this regard, the second mechanism 88 may be configured to be operative when the valve element 62 is near the valve seat 64 (i.e., near the closed position), but otherwise has a small to negligible impact on the dynamics of the valve element 62. This localized effect of second mechanism 88 is in sharp contrast to a spring, which is operative during the entire movement of the valve element 62 between the opened and closed positions. This localized effect allows the functions of maintaining the valve element 62 in the closed position until a suitable threshold pressure drop is imposed thereacross, and facilitating proper seating of the valve element 62 in valve seat 64 to be achieved without negatively impacting the positive aspects of the first mechanism 84. According to another embodiment discussed below with reference to FIGS. 5 and 6, the second element 88 may be configured to be operative over all positions of the valve element 62.

In one embodiment, the second mechanism 88 may be configured to operate on the principle of magnetism. Magnetism provides a localized effect when two magnetic members are in proximity to each other but has a diminished effect when the two magnetic members move away from each other. Accordingly, the second mechanism 88 may include a first magnetic member 90 associated with the valve element 62 and a second magnetic member 92 associated with the housing 26 that are configured to be attracted to one another. The first and second magnetic members 90, 92 may be selected from permanent magnets, electro-magnets, and/or materials that are attracted to such magnets, which may include, for example, ferromagnetic, ferrimagnetic, and paramagnetic materials, and the like. In one configuration, for example, second magnetic member 92 may be a permanent magnet, and the first magnetic member 90 may be a portion of valve element 62 configured as a plate member formed from a material attracted to the permanent magnet, such as those discussed above.

The first magnetic member 90 may be disposed adjacent a proximal end of the stem 68 opposite the piston 66, and the second magnetic member 92 may be coupled to the housing 26, such that when the valve element 62 is in the closed position, the first magnetic member 90 is positioned adjacent to the second magnetic member 92. For example, when in the closed position (FIG. 2), the first magnetic member 90 may be in contact with or in near contact with the second magnetic member 92. In the open position (FIG. 3), however, the first magnetic member 90 may be moved away from second magnetic member 92. The particular choice of first and second magnetic members 90, 92 as a material attracted to a permanent magnet and a permanent magnet is exemplary and those of ordinary skill in the art will recognize other configurations and combinations that are within the scope of the invention.

Operation of line leak detector 24 will now be described in reference to FIGS. 2-4. To facilitate the discussion of operation of leak detector 24, it is initially assumed that the dispensing system 10 is operating under a no leak condition and the dispensing unit 18 is closed, such that no fuel is being dispensed therefrom. In this state, the pressure upstream and downstream of leak detector 24 is substantially equal to each other and substantially equal to the output pressure of the submersible pump 14. Consequently, the valve 56 is in the closed position and there is no fluid flow through the bypass line 58. This configuration is illustrated in FIG. 2. During testing of the fluid conduit line 16, the submersible pump 14 is typically on or active such that the pressure upstream of the leak detector 24 remains substantially constant (and equal to pump pressure).

As illustrated in FIG. 3, when the dispensing unit 18 is opened, such as when filling a motor vehicle or the like, fuel from the conduit line 16 flows toward dispensing unit 18 such that the pressure downstream of leak detector 24 begins to drop. As a result, the pressure drop across the piston 66 increases (e.g., high pressure on upstream side and low pressure on downstream side). This pressure drop across piston 66 continues to increase until a threshold pressure drop across piston 66 is reached or exceeded. At this point, the force imposed on piston 66, as a result of fluid pressure, is sufficient to overcome the net positive buoyant force from the first mechanism 84 (relatively small force) and the magnetically-induced force from the second mechanism 88, which is the primary force that keeps the valve element 62 closed until the threshold pressure drop is reached. Consequently, the valve element 62 moves toward the opened position and fluid is capable of flowing through valve 56 along its primary flow path.

By way of example, and without limitation, the threshold pressure drop to overcome these forces and move the valve element 62 toward the opened position may be between approximately one-half (0.5) psi and approximately four (4) psi. This range is exemplary and other values are possible depending on the specific application and/or other factors. In the opened position, the net positive buoyant force from the first mechanism 84, which remains relatively small, operates to urge the valve element 62 toward the closed position, and the magnetically-induced force from second mechanism 88 is very small to substantially negligible as the first and second magnetic members 90, 92 are sufficiently separated. Accordingly, it is relatively easy to keep the valve 56 opened wide under fluid pressure and avoid flow restriction due to the return force of the valve 56.

When the dispensing unit 18 is turned off, the fluid pressure in conduit line 16 equalizes such that the net positive buoyant force from the first mechanism 84 moves valve element 62 toward the closed position. When the valve elements 62 approaches the closed position, the force from second mechanism 88 increases to snap the valve element 62 into valve seat 64 and close valve 56. While FIGS. 2 and 3, as well as that detailed above, show and describe operation of the leak detector 24 in a normal, no-leak state, the operation of the leak detector 24 will now be described when a leak exists in conduit line 16.

For sake of discussion, it will initially be assumed that the valve 56 is in the closed position. As illustrated in FIG. 4, in the event of a small leak in fluid conduit line 16 downstream of leak detector 24, the downstream pressure will begin to steadily drop. Accordingly, there will be a pressure drop across the piston 66 of valve element 62. However, the pressure drop, at least for small leaks, is configured to be below the threshold value and thus fluid pressure is not capable of overcoming the forces imposed by the first and second mechanisms 84, 88 (e.g., primarily the second mechanism 88) to move the valve element 62 toward the opened position. Nonetheless, the pressure drop across the piston 66 (e.g., across the ends 76, 78 of bypass line 58) may be sufficient to cause fluid to flow through the bypass line 58. As noted above, a leak rate from conduit line 16 greater than approximately one hundredths (0.01) gph will typically result in a flow of fluid through the bypass line 58. As fluid flows through the bypass line 58, the flow is sensed (flow sensor) or quantified in some manner (flow meter) by flow detector 60.

The flow detector 60 may be operatively coupled to a controller 94 and a data stream from detector 60 may be communicated thereto so as to analyze the data and make a determination of whether a leak exists in the conduit line 16. Various algorithms used to analyze the data stream to determine if a leak exists are generally known in the art and do not form a part of the present invention. If it is determined that a leak exists downstream of the leak detector 24, the submersible pump 14 may be shut off and the dispensing system 10 temporarily disabled while the leak is addressed by the appropriate personnel.

In the event that a leak occurs while the leak detector 24 is in the opened position (such as during a dispensing operation), then the behavior of the leak detector 24 depends on how large a leak exists. If the leak is relatively small, then once the dispensing unit 18 is closed (end of dispensing operation), the pressure drop across the piston 66 is insufficient to overcome the return force from primarily the first mechanism 84 (e.g., float 86), and the valve element 62 will move toward the closed position. When the first magnetic member 90 gets in proximity to the second magnetic member 92, the valve element will snap to its closed position and stop fluid flow through valve 56. Due to the leak, however, fluid will flow through the bypass line 58 and be detected (e.g., sensed/metered) by flow detector 60 in the manner described above. The submersible pump 14 may be shut off and the dispensing system 10 temporarily disabled while the leak is addressed by the appropriate personnel.

If, on the other hand, the leak detector 24 is in the opened position and a relatively large leak occurs (e.g., catastrophic leak) when the dispensing unit 18 is closed, a relatively large pressure drop will remain across piston 66. Such a pressure drop may be sufficient to prevent the valve element 62 from moving back toward the closed position under the net positive buoyant force of the first mechanism 84. With the primary path through valve 56 open, fluid may not flow through the bypass line 58 (as the fluid generally takes the path of least resistance) and thus, such a leak might not be detected by leak detector 24. To address such a scenario, leak detector 24 may include a sensor 96 for sensing when the second magnetic member 92 is in a position that corresponds with the valve element 62 being in the closed position. For example, as shown in FIGS. 2-4, the sensor 96 may be positioned adjacent the first magnetic member 90, such that when the valve element 62 is in the closed position, the second magnetic member 92 is in close proximity to sensor 96 (and in close proximity to first magnetic member 90). The sensor 96 may then, in essence, confirm that the valve element 62 is in the closed position. Sensor 96 may be a Hall-effect sensor, a reed switch, a giant magnetorestrictive device, an optical switch, a strain gauge, or other suitable sensor for detecting the location of the valve element 62.

In use, the sensor 96 and the dispensing unit 18 may each be operatively coupled to the controller 94. Thus, the controller 94 may determine if the dispensing unit 18 is opened (fuel being dispensed) or closed (fuel not being dispensed). The controller 94 is further capable of determining whether the valve element 62 is in the closed position by utilizing sensor 96. In this way, if a leak is sufficiently large that the valve element 62 does not move back to the closed position, then the controller 94 will detect that the dispensing unit 18 is closed and that the valve element 62 is in the opened position. Thus, the possibility of a rather large leak may then exist. Accordingly, the submersible pump 14 may be shut off and the dispensing system 10 temporarily disabled while the leak is addressed by the appropriate personnel.

In a similar manner, if a large leak occurs while the leak detector 24 is in the closed position, the valve element 62 may immediately open such that fluid does not flow through the bypass line 58, but instead flows through the primary flow path. Similar to above, such a leak may not be detected by flow detector 60. Again, however, controller 94 will detect that the dispensing unit 18 is closed and the valve element 62 is in the opened position such that the possibility of a rather large leak exists. As a result, the submersible pump 14 may be shut off and the dispensing system 10 temporarily disabled while the leak is addressed by the appropriate personnel. In other embodiments, the flow detector 60 may be used to determine whether the valve element 62 is in the closed position.

Figure 5:
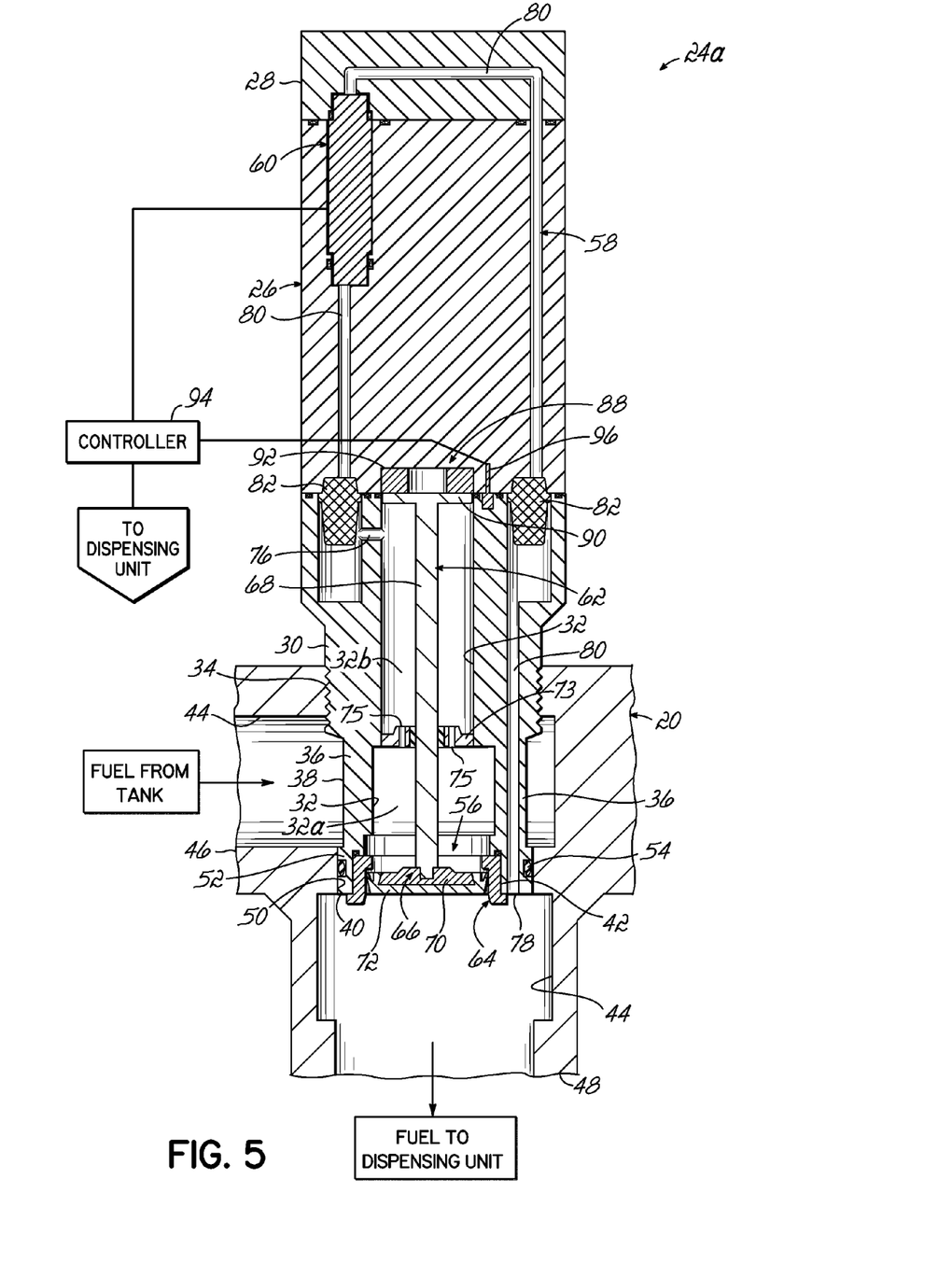
FIG. 5 is a cross-sectional view of a line leak detector according to another embodiment of the invention, and shown in a closed position.
Figure 6:
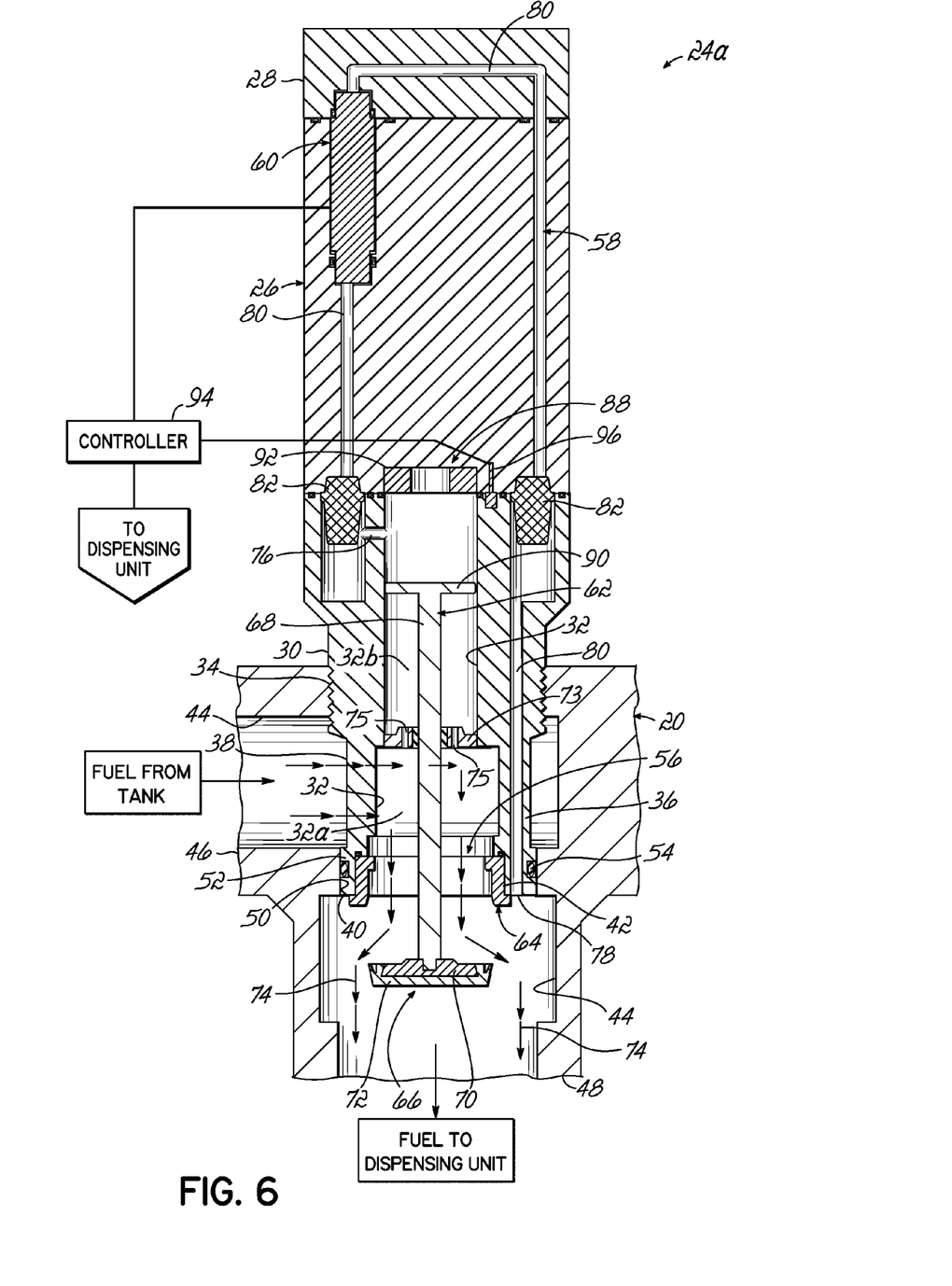
FIG. 6 is a cross-sectional view of the line leak detector shown in FIG. 5 but in the open position.

Referring next to FIGS. 5 and 6, another embodiment of a leak detector is shown and is indicated at 24a. Many of the features shown in FIGS. 5 and 6 are the same as the features shown in FIGS. 1-4, so the same reference numerals have been used. However, the leak detector 24a of FIGS. 5 and 6 does not include the first mechanism 84, including its float 86. Rather, the functions performed by the first mechanism 84 and the second mechanism 88 may be accomplished in the leak detector 24a by the second mechanism 88 alone. In particular, the second mechanism may perform one or more of the following functions: i) retaining a valve element in a closed position until a threshold pressure drop across the valve element is reached; ii) ensuring proper seating of the valve element in a valve seat as the valve element is moved toward the closed position; and iii) providing a force that urges the valve element toward the closed position.

The second mechanism 88 may include a first magnetic member 90 associated with the valve element 62 and a second magnetic member 92 associated with the housing 26. The first magnetic member 90 and the second magnetic member 92 are configured to be magnetically attracted to one another, as above. Except as will now be described, the structure and operation of the leak detector 24a is the same as the structure and operation of the leak detector 24 shown in FIGS. 1-4, and reference may be made to the description of the leak detector 24 for features of the leak detector 24a, including its operation.

According to the embodiment shown in FIGS. 5 and 6, the leak detector 24a may include a second mechanism 88 configured to be operative over all positions of the valve element 62. In this embodiment, there is no first mechanism 84. That is, the first and second magnetic members 90, 92 maintain a non-negligible magnetic attraction force between them over all positions of the valve element 62, including when the valve 56 is in the open position. Thus, the second mechanism may provide a return force urging the valve element 62 toward the closed position when it is in the open position. Such an arrangement may be achieved by selection of the first and second magnetic members 90, 92 so as to have appropriate magnetic attraction force characteristics, which selection will be recognizable to one of ordinary skill in the art in view of the teachings contained herein. As above, for example, the second magnetic member 92 may be a permanent magnet, and the first magnetic member 90 may be a portion of valve element 62 configured as a plate member formed from a material attracted to the permanent magnet. Again, the particular choice of the first and second magnetic members 90, 92 as a material attracted to a permanent magnet and a permanent magnet is exemplary and those of ordinary skill in the art will recognize other configurations and combinations that are within the scope of the invention, including where the first and second magnetic members 90, 92 are both magnets.

In the open position, the first magnetic member 90 may be moved away from the second magnetic member 92. A non-negligible magnetic attraction force is maintained between the first and second magnetic members 90, 92 in the open position, and as the fluid pressure in the conduit line 16 equalizes, the magnetic attraction force between the first and second magnetic members 90, 92 moves the valve element 62 toward the closed position. As the valve element 62 approaches the closed position, the magnetic attraction force between the first and second magnetic members 90, 92 increases to snap the valve element 62 into the valve seat 64 and close the valve 56. In the closed position, an even stronger magnetic attraction force exists between the first and second magnetic members 90, 92. The first and second magnetic members 90, 92 may be in proximity to each other when the valve element 62 is in the closed position.

Because a magnetic attraction force is involved, it will be appreciated that the magnetic attraction force between the first and second magnetic members 90, 92 may be dependent on the distance between them. Particularly, the magnetic attraction force typically decreases as the distance is increased between the first and second magnetic members 90, 92. By way of example, the magnetic attraction force may be generally inversely proportional to the square of the distance between the first and second magnetic members 90, 92.

As illustrated in FIG. 6, when the dispensing unit 18 is opened, such as when filling a motor vehicle or the like, fuel from the conduit line 16 flows toward dispensing unit 18 such that the pressure downstream of leak detector 24 begins to drop. As a result, the pressure drop across the piston 66 increases (e.g., high pressure on upstream side and low pressure on downstream side). This pressure drop across piston 66 continues to increase until a threshold pressure drop across piston 66 is reached or exceeded. At this point, the force imposed on piston 66, as a result of fluid pressure, is sufficient to overcome the magnetic attraction force holding the valve element 62 in the closed position. Consequently, the valve element 62 moves toward the opened position, and fluid is capable of flowing through valve 56 along its primary flow path.

By way of example, and without limitation, the threshold pressure drop to overcome the magnetic attraction force and move the valve element 62 toward the opened position may be between approximately one-half (0.5) psi and approximately five (5) psi. This range is exemplary, however, and other values are possible depending on the specific application and/or other factors. In the opened position, the magnetic attraction force between the first and second magnetic members 90, 92 may be sufficiently small such that it is relatively easy to keep the valve 56 opened wide under fluid pressure and avoid flow restriction due to the return force of the valve 56.

When the dispensing unit 18 is turned off, the fluid pressure in conduit line 16 equalizes such that the magnetic attraction force of the second mechanism 88 moves valve element 62 toward the closed position. When the valve element 62 approaches the closed position, the magnetic attraction force increases and the valve element 62 is moved into the valve seat 64 to close valve 56. In some embodiments, the magnetic attraction force between the first and second magnetic members 90, 92 may be the only mechanism acting on the valve element 62 when in an open position to move the valve element 62 toward the closed position.

In some embodiments, the magnetic attraction force between the first and second magnetic members 90, 92 when the valve 56 is in the open position may be substantially equal to the net positive buoyancy force on the valve element 62 created by the first mechanism 84, discussed above. Particularly, the magnetic attraction force may be between approximately 0.0625 lbf (0.28 N) and approximately 1.0 lbf (4.45 N). These values, however, are exemplary and different values/ranges may be used depending on the specific application.

In these or other embodiments, the magnetic attraction force at various positions of the valve element 62 may be described as follows with respect to an exemplary valve of a line leak detector constructed according to the concepts disclosed herein. When the valve is in the closed position and the valve element is in the valve seat, the magnetic attraction force between the first and second magnetic members may be approximately 5.34 lbf (23.75 N). When the valve element is separated from the valve seat by a distance of 0.2 inches, the magnetic attraction force may be approximately 3.57 lbf (15.88 N). When the valve element is separated from the valve seat by a distance of 0.4 inches, the magnetic attraction force may be approximately 1.79 lbf (7.96 N). When the valve element is separated from the valve seat by a distance of 0.6 inches, the magnetic attraction force may be approximately 0.82 lbf (3.64 N). When the valve element is separated from the valve seat by a distance of 0.8 inches, the magnetic attraction force may be approximately 0.44 lbf (1.96 N). These values, however, are exemplary and different values/ranges may be used depending on the specific application.

The operation of the line leak detector 24a in the event of a leak is essentially the same as what is disclosed above with respect to line leak detector 24, except for the mechanism responsible for moving the valve element 62 toward the closed position and keeping it in the closed position, and no further description of the operation in the event of a leak is believed necessary.

Without being limited hereby, the leak detectors described above provide a number of benefits over current leak detectors. A primary benefit is that, due to the particular design of the leak detectors, flow restriction normally associated with current leak detector designs are eliminated, or at the very least, significantly reduced. As noted above, the flow restriction of prior leak detectors is primarily a consequence of using a spring having a high spring constant to perform several functions, including, for example, providing a force for urging the valve element toward the closed position and maintaining the valve element in the closed position until a threshold pressure drop is reached.

The flow restriction of prior devices is addressed by some embodiments disclosed herein by providing two separate mechanisms, each achieving one or more of the above-identified functions. As described above, in one embodiment the first mechanism urges the valve element toward the closed position, while the second mechanism maintains the valve element in the closed position until the threshold pressure drop is reached. The second mechanism may also facilitate proper seating of the valve element in the valve seat. Moreover, separating the functions allows the mechanisms to be specifically tailored to those functions in an optimal manner. Thus, for example, when the valve is in the closed position, the second mechanism may be the operative mechanism while any effects from the first mechanism are relatively small. Conversely, when the valve is in the opened position, the first mechanism may be the operative mechanism while any effects from the second mechanisms are relatively small.

Due to this separation of function, the first mechanism may be designed in a manner that addresses flow restriction without affecting the other functions related to the cracking pressure of the valve. Thus, for example, the first mechanism may include a float that gives the valve element assembly a relatively small net positive buoyant force that urges the valve element toward the closed position. The relatively small net positive buoyant force imposed by the first mechanism allows the valve element assembly to be moved rather easily under fluid pressure. Thus, the valve may be opened wide for relatively low pressure drops across the valve element. This ability to open in a relatively unimpeded manner, in turn, significantly reduces any flow restriction through the valve, and higher flow rates relative to spring-based systems may be achieved for the same pressure drop across the valve element.

This separation in function also allows the design of the second mechanism to be optimized as well. Thus, for example, the second mechanism may operate on the principle of magnetism such that when the valve element is near the valve seat, the attractive forces properly seat the valve element in the valve seat and maintain the valve element in the closed position until the threshold pressure drop across the valve element is reached. The attractive forces, however, have primarily a local effect (i.e., operating near the closed position) and diminish as the valve element moves away from the valve seat and toward the opened position. Thus, the second mechanism does not interfere with the positive benefits gained by the first mechanism as described above.

The flow restriction of prior devices is also addressed by other embodiments disclosed herein where only a single mechanism is used (the second mechanism 88), and the movement of the valve element is related solely to the magnetic attraction force between first and second magnetic members. As described above in an alternative embodiment, the second mechanism may be the primary or sole mechanism that urges the valve element toward the closed position and maintains the valve element in the closed position until the threshold pressure drop is reached. The second mechanism may also facilitate proper seating of the valve element in the valve seat. Consolidating the functions in the second mechanism eliminates the need for the first mechanism. Accordingly, the second mechanism may be designed in a manner that addresses flow restriction without affecting the other functions of the valve. Because the magnetic attraction force decreases as the distance between the first and second magnetic members is increased, the valve may be easily maintained in an open position. Moreover, the valve may be opened wide for relatively low pressure drops across the valve element. This ability to open in a relatively unimpeded manner significantly reduces any flow restriction through the valve, and higher flow rates relative to spring-based systems may be achieved for the same pressure drop across the valve element. In addition, when the valve element is near the valve seat, the magnetic attraction force of the second mechanism may properly seat the valve element in the valve seat and maintains the valve element in the closed position until the threshold pressure drop across the valve element is reached. A reason a single mechanism works is because the magnetic attraction force decreases as the magnetic elements are separated, but remains sufficient to move the valve element toward the closed position once, for example, the pump is shut off and the pressure equalizes. Accordingly, this mechanism allows a valve to have an open position that addresses some of the problems with valves that use springs. More particularly, in valves that use springs, in most cases the return force increases with the distance a valve is moved from the closed position. This may limit the extent to which the valve may open under normal operating pressure drops, which may have adverse and limiting effects on flow through the valve.

While the present invention has been illustrated by a description of various preferred embodiments and while these embodiments have been described in some detail, it is not the intention of the Applicant to restrict or in any way limit the scope of the appended claims to such detail. For example, while the first mechanism 84 has been described herein as a float 86, other mechanisms may be used in accordance with alternative embodiments of the invention. In this regard, a relatively weak (e.g., relatively small spring constant) spring may be used as the first mechanism 84 (not shown). In this regard, the weak spring is not designed to perform multiple functions, as the spring in prior art devices. Instead, the weak spring is designed to urge the valve element toward the closed position without also being the mechanism that maintains the valve element in the closed position until the threshold pressure drop is reached.

The relatively small spring constant may be selected such that when the valve element is in the closed position (or near the closed position such that the second mechanism is effective for closing the valve element), the spring force should be approximately equal to the weight of the valve element. For example, the weak spring may have a spring constant between approximately 0.0625 lbf (0.28 N) and approximately 0.5 lbf (2.22 N). Because the weak spring is capable of readily moving under fluid pressure, similar to the float 86, flow restriction through the valve is either eliminated or significantly reduced as compared to conventional spring-based devices. Although the force imposed by the weak spring is no longer constant, the force imposed by the spring is contemplated to remain relatively small for the entire deflection of the weak spring during use.

Furthermore, while the valve element 62 has been described herein as a piston 66 and stem 68, other valve elements are possible that are within the scope of the present invention. By way of example, in an alternative embodiment, the valve element may include a flap that is hingedly coupled to the valve seat (not shown). In a similar manner as described above, a stem may be coupled to the valve seat (such as by a flexible joint) that operates in a manner similar to stem 68 described above.

In view of the above, additional advantages and modifications will readily appear to those skilled in the art. The various features of the invention may be used alone or in numerous combinations depending on the needs and preferences of the user.

What is claimed is:

1. An apparatus for detecting a leak in a fluid conduit line, comprising:
    a housing configured to be in fluid communication with the fluid conduit line;
    a valve including a valve seat coupled to the housing and a valve element movable relative to the valve seat between an opened position wherein fluid is permitted to flow through the valve, and a closed position wherein fluid is prevented from flowing through the valve, the valve seat including a barrel extending along a length and the valve element including a piston configured to slidingly engage the barrel along the length, whereby the valve element remains in the closed position while the piston slidingly engages the barrel for small movements of the valve element until the piston no longer engages the barrel and the valve element reaches the opened position;
    a bypass line having a first end in fluid communication with a first side of the valve and a second end in fluid communication with a second side of the valve;
    a fluid flow detector operatively coupled to the bypass line and configured to detect the flow of fluid therethrough; and
    a mechanism configured to provide a return force on the valve element when the valve element is immersed in the fluid flowing through the fluid conduit line, the return force configured to urge the valve element toward the closed position, wherein the return force decreases as the valve element is moved away from the closed position.

2. The apparatus of claim 1, wherein the mechanism includes a first magnetic member and a second magnetic member, and wherein the return force is a magnetic attraction force between the first magnetic member and the second magnetic member.

3. The apparatus of claim 2, wherein the magnetic attraction force is between approximately 0.0625 lbf and approximately 1.0 lbf in the opened position.

4. The apparatus of claim 2, wherein the mechanism is configured so the magnetic attraction force maintains the valve element in the closed position until a threshold pressure drop across the valve element is reached.

5. The apparatus of claim 4, wherein the first magnetic member is coupled to the valve element and the second magnetic member is coupled to the housing, the first and second magnetic members being in proximity to each other when the valve element is in the closed position.

6. The apparatus of claim 5, wherein each of the first and second magnetic members may be selected from the group consisting of a permanent magnet, an electromagnet, a ferromagnetic material, a ferrimagnetic material, and a paramagnetic material.

7. The apparatus of claim 5, wherein the first magnetic member includes a portion of the valve element formed of a ferromagnetic material, a ferrimagnetic material, or a paramagnetic material, and the second magnetic member includes a permanent magnet.

8. The apparatus of claim 4, wherein the threshold pressure drop for causing the valve element to move away from the closed position is between approximately one-half (0.5) psi and approximately five (5) psi.

9. The apparatus of claim 1, further comprising:
    a sensor coupled to one of the housing and the valve element configured to detect when the valve element is in the closed position.

10. The apparatus of claim 1, wherein the fluid flow detector includes a thermal flow detector.

11. An apparatus for detecting a leak in a fluid conduit line, comprising:
    a housing having an inlet, an outlet, and an interior cavity;
    a valve disposed at least in part in the interior cavity between the inlet and outlet, the valve including a valve seat coupled to the housing and a valve element movable relative to the valve seat between an opened position wherein fluid is permitted to flow through the valve, and a closed position wherein fluid is prevented from flowing through the valve, the valve seat including a barrel extending along a length and the valve element including a piston configured to slidingly engage the barrel along the length, whereby the valve element remains in the closed position while the piston slidingly engages the barrel for small movements of the valve element until the piston no longer engages the barrel and the valve element reaches the opened position;

a bypass line having a first end in fluid communication with a first side of the valve and a second end in fluid communication with a second side of the valve;

a fluid flow detector operatively coupled to the bypass line and configured to detect the flow of fluid therethrough;

a single mechanism configured both to urge the valve element toward the closed position and to maintain the valve element in the closed position until a threshold pressure drop across the valve element is reached, wherein the mechanism comprises a first magnetic member and a second magnetic member and the mechanism is the sole mechanism urging the valve element toward the closed position and maintaining the valve element in the closed position until a threshold pressure drop across the valve element is reached.

12. The apparatus of claim 11, wherein the mechanism is configured to provide a magnetic attraction force on the valve element when the valve element is immersed in the fluid flowing through the fluid conduit line.

13. The apparatus of claim 12, wherein the magnetic attraction force provided by the mechanism is between approximately 0.0625 lbf and approximately 1.0 lbf.

14. The apparatus of claim 11, wherein the first magnetic member is coupled to the valve element and the second magnetic member is coupled to the housing.

15. The apparatus of claim 11, wherein the mechanism provides a variable force on the valve element.

16. The apparatus of claim 15, wherein the mechanism provides a magnetic attraction force on the valve element when in the closed position having a magnitude, the magnitude of the magnetic attraction force decreasing as the valve element moves toward the opened position.

17. The apparatus of claim 15, wherein the magnetic attraction force provided by the mechanism is non-negligible when the valve element is in the opened position.

18. A dispensing system, comprising:
a tank for holding a liquid;
a dispensing unit for dispensing the liquid;
a fluid conduit line providing fluid communication between the tank and the dispensing unit; and
a leak detector in fluid communication with the fluid conduit line and configured to detect a leak therein, the leak detector comprising:
  a housing having an inlet, an outlet, and an interior cavity;
  a valve disposed at least in part in the interior cavity between the inlet and outlet, the valve including a valve seat operatively coupled to the housing and a valve element movable relative to the valve seat between an opened position wherein liquid is permitted to flow through the valve, and a closed position wherein liquid is prevented from flowing through the valve, the valve seat including a barrel extending along a length and the valve element including a piston configured to slidingly engage the barrel along the length, whereby the valve element remains in the closed position while the piston slidingly engages the barrel for small movements of the valve element until the piston no longer engages the barrel and the valve element reaches the opened position;
  a bypass line having a first end in fluid communication with a first side of the valve and a second end in fluid communication with a second side of the valve;
  a fluid flow detector operatively coupled with the bypass line and configured to detect the flow of liquid therethrough;
  a mechanism configured to provide a return force on the valve element when the valve element is immersed in the fluid flowing through the fluid conduit line, the return force configured to urge the valve element toward the closed position, wherein the return force decreases as the valve element is moved away from the closed position.

19. The dispensing system of claim 18, wherein the mechanism includes a first magnetic member and a second magnetic member.

20. The dispensing system of claim 19, wherein the first magnetic member is coupled to the valve element and the second magnetic member is coupled to the housing, the first and second magnetic members being in proximity to each other when the valve element is in the closed position.

* * * * *